UNITED STATES PATENT OFFICE 2,647,877

RESINOUS COMPOSITION COMPRISING A VINYL CHLORIDE POLYMER AND A BENZOTHIAZYLMERCAPTOACETIC ACID ESTER AS A PLASTICIZER

Joachim Dazzi, Dayton, Ohio, assignor to Monsanto Chemical Company, St. Louis, Mo., a corporation of Delaware No Drawing. Application January 14, 1952,
Serial No. 267,319

4 Claims. (Cl. 260—30.2)

This invention relates to new resinous compositions of matter having utility under widely varying conditions. More particularly the invention relates to the use of esters of benzothiazylmercaptoacetic acid as plasticizers for vinyl chloride resins.

The primary purpose of this invention is to provide improved plasticizers for vinyl chloride resins. A further purpose of this invention is to provide new resinous compositions having desirable flexibility over wide temperature ranges. A still further purpose of this invention is to provide inexpensive resinous compositions which retain the plasticizer at elevated temperatures.

It has been found that esters of benzothiazylmercaptoacetic acid having the following structural formula are efficient plasticizers for vinyl chloride polymers.

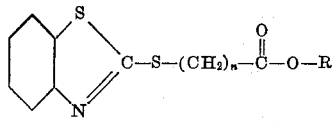

wherein $n$ is a small whole number from one to two, inclusive, and R is a monovalent aliphatic radical of the group consisting of hydrocarbon, thiahydrocarbon and oxahydrocarbon radicals having a total of from four to twelve carbon, oxygen and sulfur atoms. This class of plasticizers includes the esters of benzothiazylmercaptoacetic acid and alcohols, of which the following are typical examples: n-butanol, t-butanol, n-amyl alcohol, 2-ethylhexanol, the cyclohexanols, tetrahydrofurfuryl alcohol, the various nonyl alcohols, the normal and branched chain dodecyl alcohols, 2-ethoxyethyl alcohol, 2(n-butoxy)-ethyl alcohol, 2-thia-n-amyl alcohol ($CH_3$—$CH_2$—S—$CH_2$—$CH_2$—OH) and other aliphatic monohydric alcohols having four to twelve carbon atoms, and the corresponding alcohols which have one or more $CH_2$ groups replaced by oxygen and/or sulfur atoms.

The following specific compounds are included within the scope of the claims.

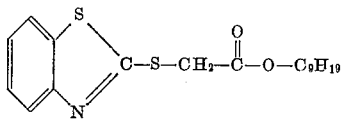

Nonyl benzothiazylmercaptoacetate

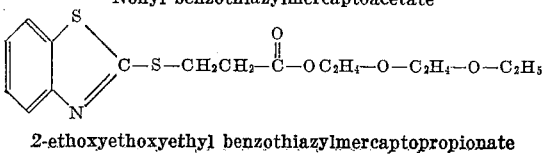

2-ethoxyethoxyethyl benzothiazylmercaptopropionate

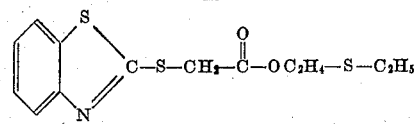

3-thia-n-amyl benzothiazylmercaptoacetate

The plasticizers are made by esterification of benzothiazylmercaptoacetic acid, the salt of which is first prepared in aqueous alkaline solution from 2-mercaptobenzothiazole and the sodium salt of chloracetic acid. The acid preparation is made by first heating the reagents at a temperature between 30 and 60° C. and then separating the desired acid by acidification of the alkaline reaction mixture. The esters are then prepared by refluxing the acid with the desired alcohol of the type above described, in the presence of a suitable catalyst, and separating the evolved water by a suitable continuous method, for example with a Dean and Stark trap.

The new compounds are valuable plasticizers for polyvinyl chloride and copolymers of more than 70 percent of vinyl chloride and up to 30 percent of other monomers copolymerized therewith, for example vinyl acetate and other vinyl esters of monocarboxylic acids, ethyl maleate, ethyl fumarate and other alkyl esters of maleic and fumaric acids.

The plasticizers are blended with the vinyl resin in the conventional manner, for example by mixing on a roll mill, a Banbury type mixer or any other suitable mixing device. The plasticizers are used in proportions necessary to achieve the desired plasticity. Although the quantity of plasticizer will depend upon the particular polymer to be plasticized, it is generally found that from 5 to 60 percent of plasticizer will in most cases produce a satisfactory composition for general utility. Such quantity of plasticizer will generally remain as a permanent part of the vnyl resin and the modified vinyl resin so prepared will not deteriorate or become embrittled by reason of the loss of the plasticizer during use.

The values of the plasticizers are estimated by three tests (1) compatibility, (2) volatility, and (3) Clash-Berg flex temperature. The compatibility is determined by visual inspection, clarity being a requisite in many applications for vinyl chloride polymers. The volatility is estimated by the test of heating at 105° C. for 24 hours and measuring the percentage of the plasticizers evaporated by loss of weight. The Clash-Berg flex temperature is determined by cooling the polymer sample to about —50° C. and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymer is to be subjected to outside weather conditions flex temperatures of −20 to −30° C. are desirable, otherwise 0° C. is satisfactory. If the polymer is to be subjected to elevated temperatures a volatility of 5 to 10 percent is advantageous, otherwise volatilities as high as 25 percent are often not objectionable. The volatilities and flex temperatures, of polymer plasticizer blends are difficult to predict and often have no apparent relationship to the physical constants of the plasticizer.

The new plasticizers are of general utility in softening vinyl chloride polymers and are effective over a wide range of temperatures. They may be used as the only plasticizing component in a compounded vinyl chloride polymer or they may be used in conjunction with other plasticizers.

Specific examples of the practice of this invention are:

*Example 1*

A solution of sodium chloroacetate was prepared by dissolving 94.5 grams of chloracetic acid in 250 ml. of water containing 53 grams of sodium carbonate. This solution was then added to a previously prepared solution of 100 ml. of water, 40 grams of sodium hydroxide and 167.3 grams of 2-mercaptobenzothiazole. The mixture was permitted to stand at 15 to 20° C. for fifteen minutes. The reaction mass was then acidified with hydrochloric acid to a pH of 3 (Congo Red). The solid acid which precipitated was filtered and washed with 200 ml. of distilled water. The resulting product which contained some sodium chloride was suspended in 600 ml. of water and stirred for four hours at room temperature. The slurry was then filtered and dried. The solid product was identified as benzothiazylmercaptoacetic acid.

*Example 2*

A reaction flask was charged with 45 grams of 2-benzothiazylmercaptoacetic acid, 74 grams of n-butanol, 20 ml. of toluene, and a trace of toluene sulfonic acid. The mixture was heated at reflux temperature for four and one-half hours while continuously collecting the evolved water. The product was then washed until neutral and distilled at reduced pressure. The product boiling between 200 and 208° C. at 1 mm. of mercury was separated and identified as the n-butyl ester of 2-benzothiazylmercaptoacetic acid.

*Example 3*

Using the procedure described in the preceding example, except that 2-ethylhexyl alcohol was used in place of the n-butanol, an ester was prepared and identified as 2-ethylhexyl benzothiazylmercaptoacetate.

*Example 4*

The procedure of Example 2 was repeated, using butyl Cellosolve (butoxyethyl alcohol) in place of butanol. The butoxyethyl benzothiazylmercaptoacetate was thereby prepared.

*Example 5*

Using test procedures described above the efficacy of the compounds of Examples 2, 3, and 4 were tested as plasticizers for polyvinyl chloride resin. Blends were prepared of 40 parts by weight of each of the esters and milled until homogeneous mixtures were prepared. The volatility and flex temperatures were measured by the standard methods described above. The following table sets forth the observed data.

| Ester of Example | Volatility, Percent | Flex Temp., ° C. |
|---|---|---|
| 2 | 13.4 | −18.5 |
| 3 | 5.4 | −21.5 |
| 4 | 7.4 | −19.2 |

The invention is defined by the following claims.

I claim:

1. A resinous composition of matter which is composed of a polymer of at least 70 percent vinyl chloride and up to 30 percent of another polymerizable monoethylenically unsaturated monomer compatible therewith, and a compound having the structural formula:

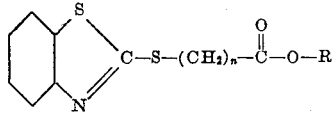

wherein $n$ is a whole number from one to two, inclusive, and R is a monovalent aliphatic radical of the group consisting of hydrocarbon, thiahydrocarbon and oxahydrocarbon radicals having a total of from four to twelve carbon, oxygen and sulfur atoms.

2. A resinous composition which is composed of polyvinyl chloride and from 5 to 60 percent by weight of 2-ethylhexyl benzothiazylmercaptoacetate.

3. A resinous composition which is composed of polyvinyl chloride and from 5 to 60 percent by weight of butoxyethyl benzothiazylmercaptoacetate.

4. A resinous composition which is composed of polyvinyl chloride and from 5 to 60 percent by weight of n-butyl benzothiazyl mercaptoacetate.

JOACHIM DAZZI.

References Cited in the file of this patent

UNITED STATES PATENTS

| Number | Name | Date |
|---|---|---|
| 2,234,215 | Youker | Mar. 11, 1941 |